US010392555B2

(12) United States Patent
Giro et al.

(10) Patent No.: US 10,392,555 B2
(45) Date of Patent: Aug. 27, 2019

(54) NANOPARTICLE DESIGN FOR ENHANCED OIL RECOVERY

(71) Applicant: International Business Machines Corporation, Armonk, NY (US)

(72) Inventors: Ronaldo Giro, Rio de Janeiro (BR); Claudius Feger, Poughkeepsie, NY (US); Mathias B. Steiner, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 14/973,785

(22) Filed: Dec. 18, 2015

(65) Prior Publication Data

US 2017/0174978 A1    Jun. 22, 2017

(51) Int. Cl.
    *C09K 8/58*      (2006.01)
    *E21B 43/16*     (2006.01)

(52) U.S. Cl.
    CPC ............. *C09K 8/58* (2013.01); *E21B 43/16* (2013.01); *C09K 2208/10* (2013.01)

(58) Field of Classification Search
    CPC ........ E21B 43/38; E21B 43/08; E21B 43/082; E21B 43/12; E21B 43/16; E21B 43/385; E21B 21/003; E21B 33/138; E21B 43/34; C09K 2208/10; C09K 8/58; C09K 8/36; C09K 8/502; C09K 8/516
    See application file for complete search history.

(56) References Cited

U.S. PATENT DOCUMENTS

| 5,855,243 A | 1/1999 | Bragg |
| 7,559,369 B2 | 7/2009 | Roddy et al. |

(Continued)

FOREIGN PATENT DOCUMENTS

| WO | 2010045545 A1 | 4/2010 |
| WO | 2012158610 A1 | 11/2012 |

OTHER PUBLICATIONS

Research Gate, "Effect of Some Parameters Influencing Enhanced Oil Recovery Process using Silica Nanoparticles: An Experimental Investigation", Conference Paper, Sep. 2013, 11 pages.

(Continued)

*Primary Examiner* — Zakiya W Bates
(74) *Attorney, Agent, or Firm* — Ewa M. Wozniak (57) ABSTRACT

A method of designing a nanoparticle tailored to support hydrocarbon recovery in a subterranean formation, a method for using nanoparticles to extract hydrocarbon from a subterranean formation, and a nanoparticle structure. The method may include determining environmental conditions of a subterranean formation, defining nanoparticle parameters based on the environmental conditions, and forming a nanoparticle comprising the nanoparticle parameters. The method may include producing a colloidal suspension of nanoparticles by mixing nanoparticles with water and injecting the colloidal suspension of nanoparticles into a subterranean formation. A nanoparticle structure may include a hydrophilic material in a defined three-dimensional shape having a maximum diameter. The nanoparticle may penetrate through an oil-water interface with an optimized contact angle, minimize an interfacial area between oil and water, and create an oil in water emulsion.

8 Claims, 7 Drawing Sheets

(56) References Cited

U.S. PATENT DOCUMENTS

| | | | |
|---|---|---|---|
| 8,175,751 | B2 | 5/2012 | Thakur et al. |
| 8,311,743 | B2 | 11/2012 | Gurpinar |
| 8,589,130 | B2 | 11/2013 | Stukan et al. |
| 2003/0220204 | A1 | 11/2003 | Baran, Jr. et al. |
| 2012/0168165 | A1 | 7/2012 | Holcomb et al. |
| 2012/0175120 | A1 | 7/2012 | Holcomb et al. |
| 2013/0091941 | A1* | 4/2013 | Huh .................. E21B 47/1015 73/152.08 |
| 2013/0330501 | A1 | 12/2013 | Aizenberg et al. |
| 2015/0075798 | A1 | 3/2015 | Tang et al. |
| 2015/0126415 | A1* | 5/2015 | Husein .................. C09K 8/516 507/140 |
| 2015/0218921 | A1 | 8/2015 | Suresh et al. |
| 2015/0225639 | A1 | 8/2015 | Khosravani et al. |
| 2017/0058186 | A1* | 3/2017 | Oghena .................. C09K 8/58 |

OTHER PUBLICATIONS

Dahle, "Investigation of how Hydrophilic Silica Nanoparticles Affect Oil Recovery in Berea Sandstone", NTNU—Trondheim Norwegian University of Science and Technology, Jun. 2014, 137 pages.

Hiendraningrat et al., "Metal Oxide-Based Nanoparticles: Revealing Their Potential to Enhance Oil Recovery in Different Wettability Systems", Appl Nanosci (2015), pp. 181-199.

Jolivet et al., "Design of Metal Oxide Nanoparticles: Control of Size, Shape, Crystalline Structure and Functionalization by Aqueous Chemistry", Science Direct, Sep. 12, 2009, pp. 40-51.

"Metal Oxide Nanostructures: Synthesis, Properties, and Applications", PCCP Themed Issue, Mar. 3, 2009, 7 pages.

Gorshkov et al., "Shape Selection in Diffusive Growth of Colloids and Nanoparticles", Langmuir Article, 2009 American Chemical Society, 14 pages.

Zhang et al., "Nanoparticle-Stabilized Emulsions for Applications in Enhanced Oil Recovery", SPE 129885, 2010 SPE Imporved Oil Recovery Symposium held in Tulsa, OK, Apr. 24-28, 2010, 18 pages.

Onyekonwu et al., "Investigating the Use of Nanoparticles in Enhancing Oil Recovery", 2010, Society of Petroleum Engineers, 14 pages.

Binks et al., "Influence of Particle Wettability on the Type and Stability of Surfactant-Free Emulsions", Langmuir 2000, 16, pp. 8622-8631.

Wasan et al., "The Welling and Spreading of Nanofluids on Solids: Role of the Structural Disjoining Pressure", Current Opinion in Colloid & Interface Science 16 (2011) pp. 344-349.

Bresme et al., "Computer Simulation Study of the Wetting Behavior and Line Tensions of Nanometer Size Particulants at a Liquid-Vapor Interface", Physical Review Letters, vol. 80, No. 17, Apr. 27, 1998, 4 pages.

Bresme et al., "Nanoparticulates at Liquid/Liquid Interfaces", Phys. Chem.Chem.Phys, 1999, 1, 2149-2155.

Bresme et al., "Nanoparticles at Fluid Interfaces", Journal of Physics Condensed Matter 19, (2007), 34 pages.

McBride et al., "Influence of Line Tension on Spherical Colloidal Particles at Liquid-Vapor Interfaces", Physical Review Letters 109, 196101 (2012), 5 pages.

Andelman et al., "Morphological Control and Photoluminescence of Zinc Oxide Nanocrystals", J. Phys. Chem. B, 2005, 109, pp. 14314-14318.

Walter et al., "Mastering the Shape and Composition of Dendronized IronOxide Nanoparticles to Tailor Magnetic Resonance Imaging and Hyperthermia", 2014 American Chemical Society, 26, pp. 5252-5264.

Ranatunga et al., "Molecular Dynamics Study of Nanoparticles and Non-ionic Surfactant at an Oil-Water Interface", Soft matter, 2011, 7, pp. 6942-6952.

* cited by examiner

NANOPARTICLE DESIGN FOR ENHANCED OIL RECOVERY

BACKGROUND

The present invention relates generally to oil extraction and more particularly, to a structure and method of designing a nanoparticle tailored to support hydrocarbon recovery in a subterranean formation.

Enhanced oil recovery (EOR), also known as tertiary oil recovery, has been utilized by the oil and gas industry for several decades. Conventional approaches to EOR may include chemical processes and thermal processes. Chemical processes may involve organic compounds like polymers, surfactants, and alkaline solutions. Chemical processes may have high losses of chemicals through adsorption, adhesion to rock surfaces, and degradation in harsh reservoir conditions. In addition, chemical processes may decrease permeability of a reservoir. Thermal processes may involve steam injection and in situ combustion. Thermal processes may be expensive and energy intensive, and may consume oil that could be recovered.

SUMMARY

According to an embodiment, a method is disclosed. The method may include A method for selecting a nanoparticle to support oil extraction in a subterranean formation. The method may include determining one or more environmental conditions of the subterranean formation. The method may include determining a set of nanoparticle parameters based on the one or more environmental conditions. A nanoparticle having one or more nanoparticle parameters from the set of nanoparticle parameters may displace a volume of water greater than another volume of oil at equilibrium at an oil-water interface under the one or more environmental conditions. The set of nanoparticle parameters may include at least one of composition, size, or shape. The method may include determining a subset of nanoparticle parameters selected from the initial set of nanoparticle parameters. A nanoparticle having the subset of nanoparticle parameters may conform to a performance criteria. The method may include selecting the nanoparticle having the subset of nanoparticle parameters.

According to an embodiment, another method is disclosed. The method may include a method for extracting oil from a subterranean formation with nanoparticles. The method may include producing a colloidal suspension of nanoparticles by combining the nanoparticles and water. The nanoparticles may have a set of nanoparticle parameters including at least one of a composition, a size, or a shape. The method may include injecting the colloidal suspension of nanoparticles into the subterranean formation. The nanoparticles having the set of nanoparticle parameters may displace a volume of water greater than another volume of oil at equilibrium at an oil-water interface in the subterranean formation. The nanoparticles having the set of nanoparticle parameters generate an oil in water emulsion. The method may include extracting the oil in water emulsion from the subterranean formation.

According to an embodiment, a structure is disclosed. The structure may include a nanoparticle comprising a set of nanoparticle parameters including a hydrophilic material, a three-dimensional shape, and a size. The nanoparticle having the set of nanoparticle parameters may displace a volume of water greater than another volume of oil at equilibrium at an oil-water interface under one or more environmental conditions of a subterranean formation. The nanoparticle having the set of nanoparticle parameters may conform to a performance criteria.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which not all structures may be shown.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

For purposes of the description hereinafter, the terms "upper", "lower", "right", "left", "vertical", "horizontal", "top", "bottom", and derivatives thereof shall relate to the disclosed structures and methods, as oriented in the drawing figures. It will be understood that when an element such as a layer, region, or substrate is referred to as being "on", "over", "beneath", or "below" another element, it may be present on or below the other element or intervening elements may also be present. In contrast, when an element is referred to as being "directly on", "directly over", "directly beneath", "directly below", or "directly contacting" another element, there may be no intervening elements present. Furthermore, the terminology used herein is for the purpose of describing particular embodiments only and is not intended to be limiting of the invention. As used herein, the singular forms "a," "an," and "the" are intended to include the plural forms as well, unless the context clearly indicates otherwise.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention relates generally to oil extraction and more particularly, to a structure and method of nanoparticle design for enhanced oil recovery. Enhanced oil recovery (EOR), also known as tertiary oil recovery, has been utilized by the oil and gas industry for several decades. Conventional approaches to EOR may include chemical processes and thermal processes. Chemical processes may involve organic compounds like polymers, surfactants, and alkaline solutions. Chemical processes may have high losses of chemicals through adsorption, adhesion to rock surfaces, and degradation in harsh reservoir conditions. In addition, chemical processes may decrease permeability of a reservoir. Thermal processes may involve steam injection and in situ combustion. Thermal processes may be expensive, energy intensive, and consume oil that could be recovered.

Embodiments of the present invention may be more stable in harsh reservoir conditions than conventional chemical processes. For example, a nanoparticle structure may be able to maintain a shape and functionality under ranges of pH, salinity, and/or pressure that may cause organic chemicals (e.g. polymers, surfactants, and/or alkaline solutions) to break down. In another example, nanoparticles may experience substantially less adhesion to rock surfaces than organic chemicals, and thus, be able to travel substantially further through a reservoir than organic chemicals. Embodiments of the present invention may be less energy intensive than thermal processes and may not consume oil intended to be recovered from the reservoir. Embodiments of the present invention may involve designing nanoparticles for use in a subterranean formation to generate highly stable oil in water emulsions. Oil in water emulsions formed by nanoparticles may reduce a surface tension between oil and water, and thus, increase oil mobility. Embodiments of the present invention may involve designing nanoparticles for use in a subterranean formation to increase water viscosity. Increased water viscosity may be used to push oil in a direction, such as, for example, toward an extraction well. A method for using nanoparticles to extract hydrocarbon from a subterranean formation is described below with reference to FIGS. 1A-4B.

Figure 1A:
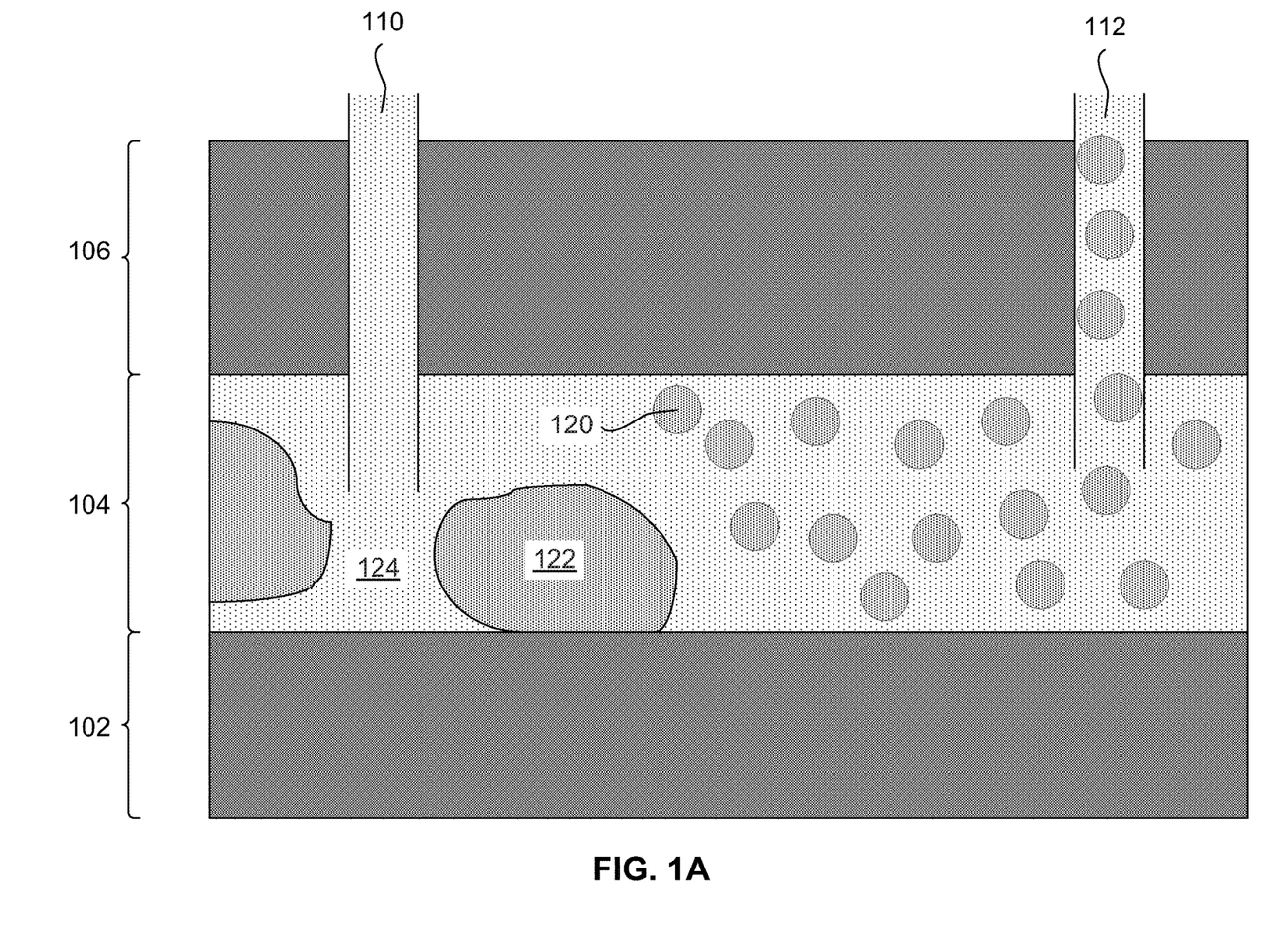
FIG. 1A is a cross section view of an enhanced oil recovery environment, according to an embodiment of the present invention.

Referring now to FIG. 1A, a cross section view of an enhanced oil recovery (EOR) environment is shown, according to an embodiment of the present invention. The EOR environment may include a first confining layer 102, a subterranean formation 104, a second confining layer 106, an injection well 110, and an extraction well 112.

The first confining layer 102 and the second confining layer 106 may be composed of an impermeable material, such as, for example, rock, clay, etc. The first confining layer 102 may be below the subterranean formation 104. The second confining layer 106 may be above the subterranean formation 104. The subterranean formation 104 may be bounded by the first confining layer 102 below, the second confining layer 106 above, and one or more confining layers on a side. Non-limiting configurations of various confining layers surrounding the subterranean formation 104 are contemplated. For example, an upper confining layer may converge with a lower confining layer to form a side boundary. In another example, a first side confining layer may converge with a second side confining layer to form an upper and/or lower boundary.

The subterranean formation 104 may be, for example, a reservoir containing oil. The subterranean formation 104 may include one or more environmental conditions, such as, for example, temperature, pressure, pH, salinity, composition, and state of matter. A temperature of the subterranean formation 104 may be determined with a thermometer into the subterranean formation 104 and receiving a temperature reading (e.g. a bottomhole pressure measurement, optical fiber measurement, etc.) and/or determined by calculating the temperature (e.g. a geothermal gradient calculation based on depth). A pressure of the subterranean formation may be determined by inserting a pressure sensing device into the subterranean formation 104 (e.g. a bottomhole pressure measurement, optical fiber measurement, etc.) and/or by calculating the pressure. A pH of the subterranean formation 104 may be determine by extracting a fluid sample, inserting a pH reading device into the subterranean formation 104, and or by calculating the pH based on other conditions. Composition of the subterranean formation 104 may include, for example, oil, water, and various minerals. For example, the subterranean formation may contain salt which may dissolve in water to create brine (i.e. a salt-water solution). Composition of the subterranean formation 104 may be determined by, for example, sampling fluid from the subterranean formation 104. A state of matter may include, for example, solid, liquid, gas, and plasma. A state of matter for a substance in the subterranean formation 104 may be determined by, for example, determining temperature and pressure and using the determined temperature and pressure to establish a state of matter for a substance with a known state at a given temperature and pressure. In an embodiment, the one or more environmental conditions may vary throughout the subterranean formation 104. For example, a pressure at a first location in the subterranean formation 104 may be different than a pressure at a second location in the subterranean formation 104. In an example, a substance may be a liquid in a first location and a gas in a second location. In an embodiment, one or more environmental conditions may change based on a measurable and/or predictable gradient throughout the subterranean formation 104. For example, pressure may increase with depth at a known and/or measured rate. In another example, temperature may increase with depth at a known and/or measured rate. In another example, the one or more environmental conditions may change over time. For example, pressure may be lower at a first time period with a low flow rate than at a second time period with a high flow rate.

Oil in the subterranean formation 104 may not readily mix with water without addition of one or more elements to the subterranean formation 104. For example, residual oil 122 may not mix with water 124. In an embodiment, the residual oil 122 may be adjacent to and in contact with a rock formation, such as, for example, a sidewall of the second confining layer 106. In another embodiment, the residual oil 122 may not be in contact with a rock formation.

In an embodiment, nanoparticles may be injected into the subterranean formation 104. For example, a colloidal suspension may be produced by combining nanoparticles and water. The colloidal suspension may have a molar ratio of nanoparticles to water ranging from about 1:10 to about 1:1000. The colloidal suspension may be injected through the injection well 110 into the subterranean formation 104. The nanoparticles may be formed with a set of properties, such as for example, a particular composition, a particular size, and a particular shape. The nanoparticles may be composed of a hydroxylated inorganic material, such as, for example, hydroxylated silicon oxide, hydroxylated titanium oxide, hydroxylated magnesium oxide, hydroxylated iron oxide, hydroxylated aluminum oxide, hydroxylated manganese oxide, and hydroxylated zinc oxide.

Nanoparticles may mean particles possessing a size of about 100 nm and less. As used herein, however, the term "nanoparticle," refers to particles possessing an average diameter ranging anywhere from about 1 nm to about 1,000 nm and ranges therebetween. For example, the nanoparticles may have an average diameter ranging from about 1 nm to about 100 nm. In another example, the nanoparticles may have a maximum diameter ranging from approximately 1 nm to approximately 10 nm and ranges therebetween. The average particle size can be measured or estimated using a range of analytical methods, such as, for example, using transmission electron microscopy (TEM) operating at an accelerating voltage of 100 kV.

The nanoparticle may be formed into a three-dimensional shape, such as, for example, a sphere, cylinder, cone, tetrahedron, square pyramid, triangular prism, cube, hexagonal prism, octagonal prism, truncated octahedron, decagonal prism, dodecagonal prism, truncated cuboctahedron, truncated icosidodecahedron, rhombic dodecahedron, rhombic triacontahedron, rhombo-hexagonal dodecahedron, truncated rhombic dodecahedron, cuboctahedron, etc.

Each of the set of properties may be specially tailored to penetrate an oil-water interface and generate oil in water emulsions under various environmental conditions of the subterranean formation 104. For example, a large nanoparticle may be formed to penetrate an oil-water interface under high pressure conditions. In another example, a particular shape (e.g. a cube-like shape) may formed to penetrate an oil-water interface under high salinity conditions. In another example, a particular composition (e.g. titanium oxide) may be formed to penetrate an oil-water interface under highly acidic conditions. Various combinations of properties of nanoparticles to optimize penetration of an oil-water interface under various environmental conditions are contemplated.

Figure 1B:
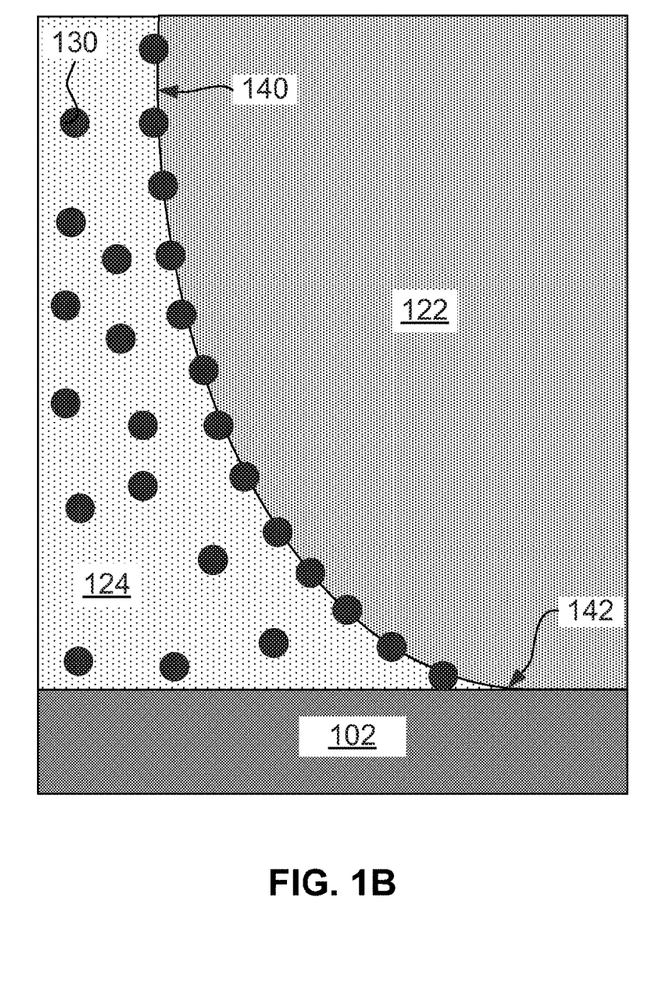
FIG. 1B is a cross section view of a wedge film, according to an embodiment of the present invention.

Referring now to FIG. 1B, a cross section view of a wedge film is shown, according to an embodiment of the present invention. In an embodiment, the residual oil 122 may be in contact with a surface of the first confining layer 102. A colloidal suspension of nanoparticles 130 may be in the water 124. Nanoparticles 130 may penetrate an oil-water interface 140 so that a portion of each nanoparticle is within the water 124 and a portion of each nanoparticle is within the residual oil 122. By penetrating the oil-water interface 140, nanoparticles 130 may reduce a surface tension between the water 124 and the residual oil 122.

The nanoparticles may penetrate the oil-water interface 140 near a three phase contact 142. The three phase contact 142 may be an area where the residual oil 122, the water 124, and the first confining layer 102 intersect. By penetrating the oil-water interface 140 near a three phase contact 142, the nanoparticles may reduce attractive forces between the residual oil 122 and the first confining layer 102. By reducing attractive forces between the residual oil 122 and the first confining layer 102, the nanoparticles may act like a wedge forcing the oil off of a surface of the first confining layer 102. The nanoparticles 130 penetrating the oil-water interface 140 near a three phase contact 142 may be referred to as a "wedge film" since the film of nanoparticles 130 on the oil-water interface 140 pries the residual oil 122 off of the first confining layer 102. Additional embodiments of wedge films forcing oil off of various surfaces (e.g., confining layers and/or non-confining rocks) are contemplated.

Figure 1C:
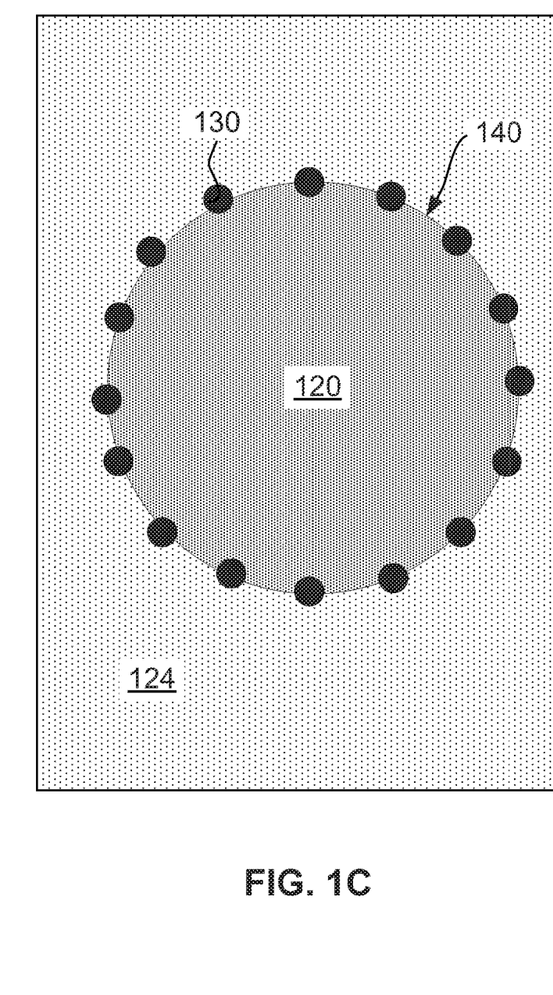
FIG. 1C is a cross section view of a Pickering emulsion, according to an embodiment of the present invention.

Referring now to FIG. 1C, a cross section view of a Pickering emulsion 120 is shown, according to an embodiment of the present invention. The Pickering emulsion 120 may be an emulsion that is stabilized by nanoparticles 130 which adsorb onto the oil-water interface 140. The Pickering emulsion 120 may have a low surface tension at the oil-water interface 140. The low surface tension of the oil-water interface 140 may allow the Pickering emulsion to travel through the water 124 with low resistance.

Figure 2:
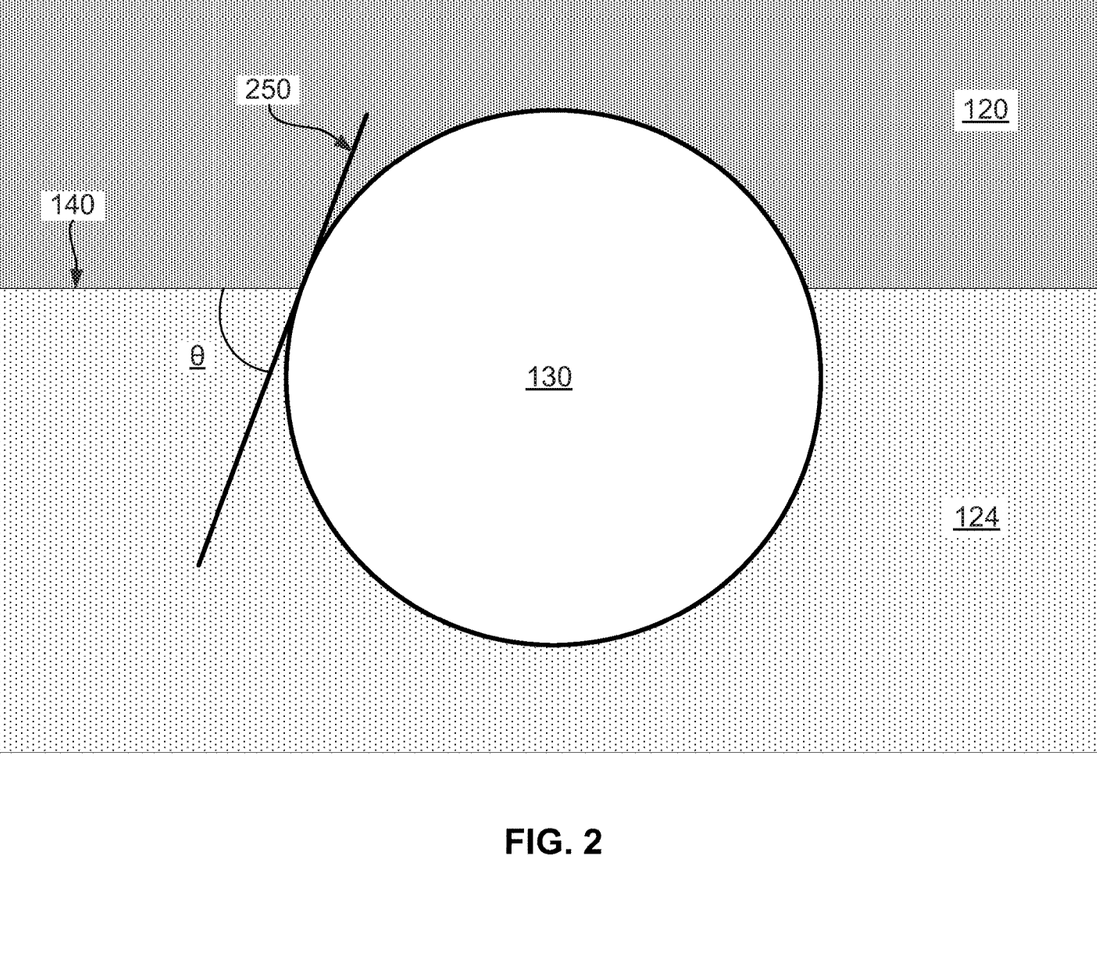
FIG. 2 is a cross section view of a nanoparticle at an oil-water interface, according to an embodiment of the present invention.

Referring now to FIG. 2, a cross section view of nanoparticle 130 at oil-water interface 140 is shown, according to an embodiment of the present invention. A contact angle $\theta$ between a tangent line 250 of a surface of an idealized spherical nanoparticle contacting the oil-water interface 140 and the oil-water interface 140 may be an acute angle. The tangent line 250 is an imaginary line used to specify the contact angle $\theta$. The tangent line 250 may run across a surface of the idealized spherical nanoparticle at a contact point between the surface of the nanoparticle and the oil-water interface 140. In an embodiment, the contact angle $\theta$ between the oil-water interface 140 and a tangent line 250 may range from approximately 70 degrees to approximately 89 degrees, and ranges therebetween. In a preferred embodiment, the contact angle $\theta$ may be approximately 80 degrees. The contact angle $\theta$ of approximately 80 degrees may provide enable the formation of small stable oil-in-water emulsions. A contact angle of 90 degrees may be unstable since it may enable formation of both oil-in-water emulsions and water-in-oil emulsions. A contact angle greater than 90 degrees may enable formation of water-in-oil emulsions which may not be helpful in oil extraction from a subterranean formation. Thus, the contact angle $\theta$ of a nanoparticle in an oil-water interface may indicate an effectiveness of oil recovery which may be achieved with the nanoparticle. Forming a nanoparticle with a particular size, shape, and composition that penetrates the oil-water interface at a contact angle $\theta$ that is acute may provide small stable oil-in-water emulsions. The small stable oil-in-water emulsions achieved with an acute contact angle of a nanoparticle may enable effective oil recovery.

Another way to establish if a nanoparticle with a non-spherical shape will provide a stable oil-in-water emulsion without using the criteria of a contact angle is to calculate (e.g., by means of computatonal simulations) the nanoparticle free energy profile across the water-oil interface. The nanoparticle free energy profile may have a minimum at the oil-water interface with an equilibrium position which is related with the amount that nanoparticle penetrates into the oil-water interface. The depth of the minimum free energy profile is a measurement of emulsion stability. By analyzing the shape of nanoparticle free energy profile across the oil-water interface it is possible to establish if oil-in-water emulsion(s) or water-in-oil emulsion(s) will be obtained.

The contact angle $\theta$ and/or the free energy profile of a nanoparticle may be controlled by adjusting one or more parameters of the nanoparticle, such as, for example, a composition, size, and/or shape. For example, a nanoparticle may comprise one or more materials (i.e. compositions), such as, for example, a metal oxide, hydrophilic material, or a combination thereof. Non-limiting examples of hydrophilic metal oxides include hydroxylated silicon oxide, hydroxylated titanium oxide, hydroxylated magnesium oxide, hydroxylated iron oxide, hydroxylated aluminum oxide, hydroxylated manganese oxide, and hydroxylated zinc oxide. Hydroxylated metal oxides may provide design flexibility in forming a specific size and/or shape of a nanoparticle. Hydroxylated metal oxides may provide a contact angle θ of a nanoparticle in an oil-water interface in an adjustable range. Varying degrees of hydroxylation may be used to adjust an attraction to water for a composition of the nanoparticle, and then control the contact angle θ and/or the free energy profile of a nanoparticle. A hydroxylated metal oxide may provide both design flexibility (e.g., size and shape control) and oil-water interface penetration control (e.g. by controlling the contact angle θ and/or the free energy profile of a nanoparticle) by exploiting the physical concept of line tension. Embodiments of controlling various sizes of nanoparticles to adjust a contact angle θ and/or the free energy profile of a nanoparticle are discussed below with reference to FIG. 3, and embodiments of controlling various shapes of nanoparticles to adjust a contact angle θ and/or the free energy profile of a nanoparticle are discussed below with reference to FIGS. 4A-4B.

Figure 3:
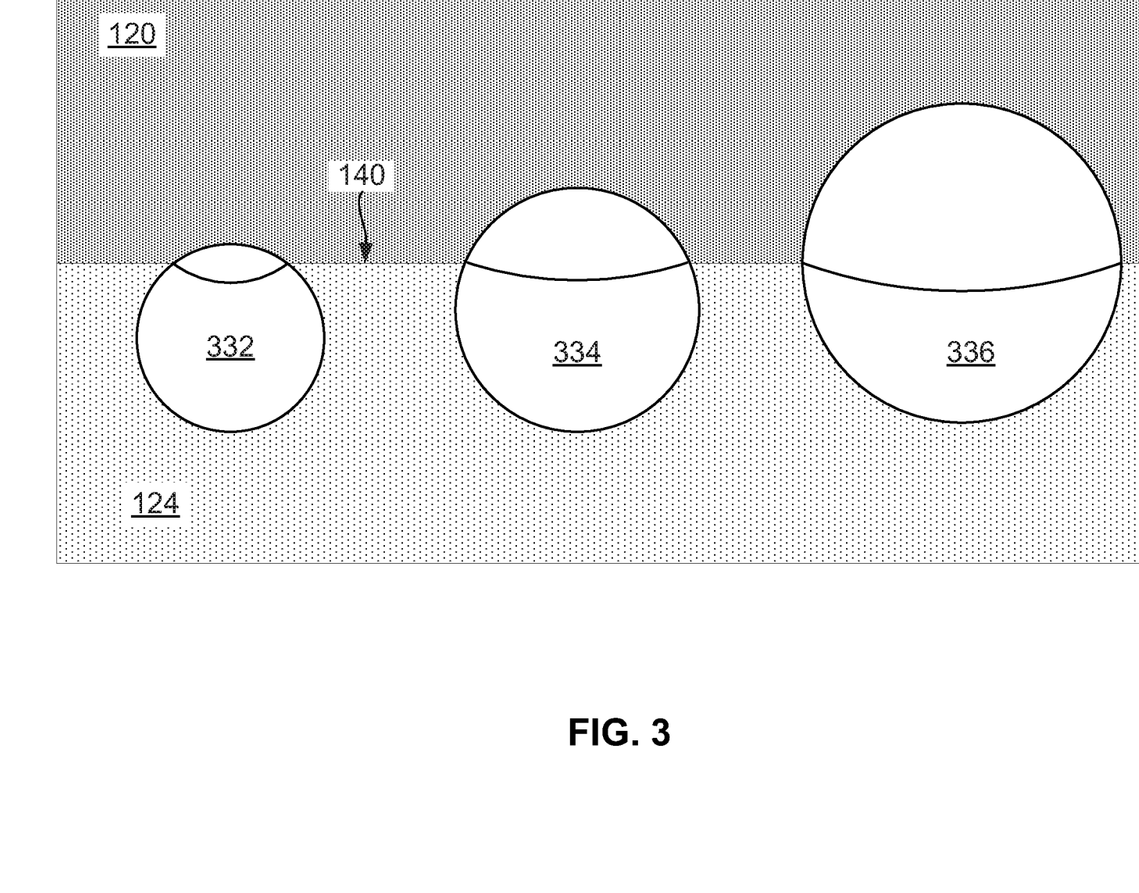
FIG. 3 is a cross section view of nanoparticles of various sizes, according to an embodiment of the present invention.

Referring now to FIG. 3, a cross section view of nanoparticles of various sizes is shown, according to an embodiment of the present invention. In an embodiment, a first nanoparticle 332, a second nanoparticle 334, and a third nanoparticle 336 may be different sizes. For example, the third nanoparticle 336 may be larger than the second nanoparticle 334, and the second nanoparticle 334 may be larger than the first nanoparticle 332.

Because the nanoparticles may be different sizes, the nanoparticles may penetrate the oil-water interface 140 at different contact angles. For example, the first nanoparticle 332 may have a smaller contact angle than the second nanoparticle 334, and the second nanoparticle 334 may have a smaller contact angle than the third nanoparticle 336. For example, the third nanoparticle 336 may have a contact angle of approximately 90 degrees. A contact angle of 90 degrees may result in unstable emulsions, making the third nanoparticle 336 unsuitable for forming stable oil-in-water emulsions (assuming no other emulsifying agent is used). In an example, the second nanoparticle 334 may have a contact angle of approximately 80 degrees. A contact angle of 80 degrees may result in stable oil-in-water emulsions, making the second nanoparticle 334 suitable for forming stable oil-in-water emulsions (even if no other emulsifying agent is used). In an example, the first nanoparticle 332 may have a contact angle of approximately 30 degrees. A contact angle of 30 degrees may result in unstable oil-in-water emulsions, making the first nanoparticle 332 unsuitable for forming stable oil-in-water emulsions (assuming no other emulsifying agent is used).

In an embodiment, an acidic medium may be used to control a nanoparticle size. For example, a nanoparticle composed of a metal oxide and/or a metal hydroxide may precipitate from an acidic medium at a particular size where the pH of the acidic medium is kept at a constant value during a precipitation process. In embodiment, a shape may stay the same as a size changes or a shape may change as a size changes. For example, an isotropic particle formed during a precipitation process may have a same shape as a size changes. In an example, an anisotropic particle formed during a precipitation process may have a different shape as a size changes. Various shapes of nanoparticles, as discussed below with reference to FIGS. 4A-4B, may have unique properties (e.g. reactivity, surface energy, line tension effects, etc.) which may change a contact angle of the nanoparticle.

Figure 4A:
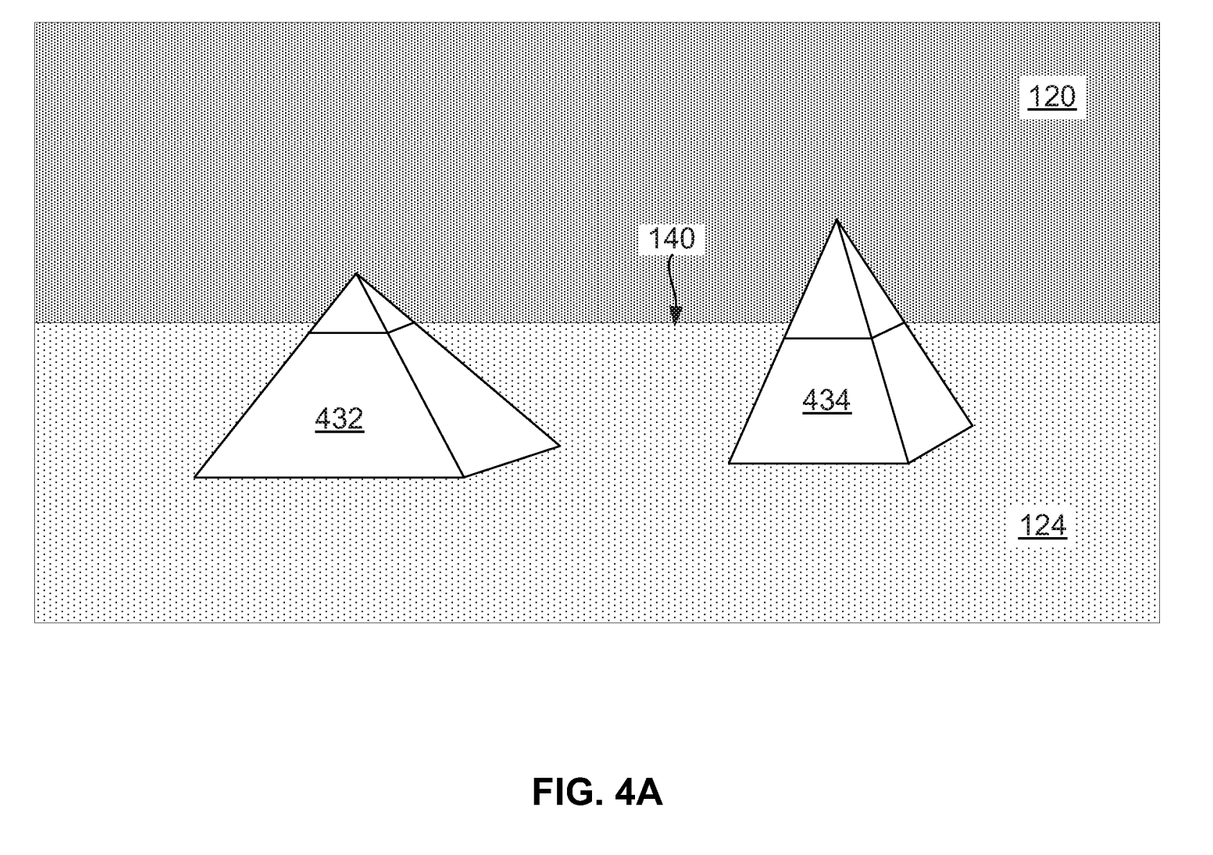
FIGS. 4A-4B is a cross section view of nanoparticles of various shapes, according to an embodiment of the present invention.
Figure 4B:
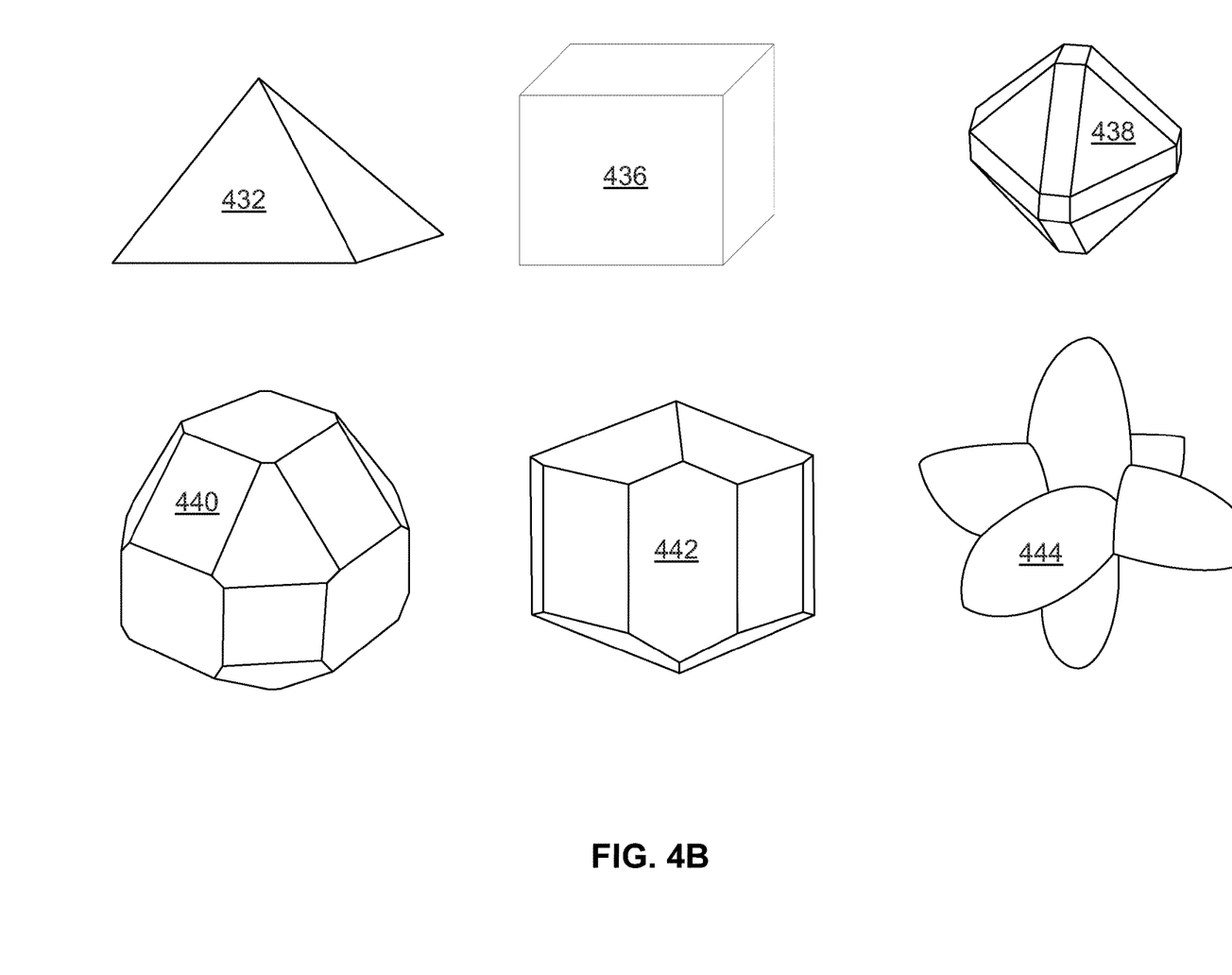

Referring now to FIGS. 4A-4B, a cross section view of nanoparticles of various shapes is shown, according to an embodiment of the present invention. In an embodiment, a fourth nanoparticle 432 and a fifth nanoparticle 434 may have different shapes. For example, the fourth nanoparticle 432 may be an equilateral square pyramid and the fifth nanoparticle 434 may be an isosceles square pyramid. Non-limiting embodiments of nanoparticles formed into various shapes are discussed below with reference to FIG. 4B. The fourth nanoparticle 432 may penetrate the oil-water interface 140 at a different contact angle than the fifth nanoparticle 434 because of its different shape. A contact angle for a non-spherical shape may be approximated by an idealized spherical representation of the shape. For example, a center of mass may be determined for a nanoparticle, and an idealized spherical representation of the nanoparticle may be determined based on the center of mass of the nanoparticle. A contact angle between a tangent line of the idealized representation of the nanoparticle and the oil-water interface 140 may be determined. For example, a contact angle of the fifth nanoparticle 434 may be determined to be approximately 80 degrees. A contact angle of approximately 80 degrees may provide a stable oil-in-water emulsion, making the fifth nanoparticle 434 suitable for forming stable oil-in-water emulsions. In an example, a contact angle of the fourth nanoparticle 432 may be determined to be approximately 40 degrees. A contact angle of approximately 80 degrees may not provide a stable oil-in-water emulsion, making the fifth nanoparticle 434 unsuitable for forming stable oil-in-water emulsions.

In FIG. 4B, nanoparticles of various shapes are shown, including a fourth nanoparticle 432, sixth nanoparticle 436, seventh nanoparticle 438, eighth nanoparticle 440, ninth nanoparticle 442, and tenth nanoparticle 444. The fourth nanoparticle 432, sixth nanoparticle 436, seventh nanoparticle 438, eighth nanoparticle 440, ninth nanoparticle 442, and tenth nanoparticle 444 may each be formed into different shapes. A shape of a nanoparticle may be controlled through any nanoparticle design method known in the art, such as, for example, by controlling properties of a nanoparticle, controlling an environment of a nanoparticle during formation, or a combination thereof. In an embodiment, a shape of a nanoparticle may be controlled by manipulating one or more nanoparticle properties, such as, for example, a size, crystal lattice orientation, and composition of the nanoparticle. In an embodiment, a shape of a nanoparticle may be controlled by manipulating adsorption effects, controlling growth kinetics steps, and through oriented attachment (e.g., controlled aggregation). Various shape controlling methods are contemplated and may be adjusted based on one or more factors such as, for example, whether a nanoparticle material is isotropic and/or anisotropic.

In an embodiment, a nanoparticle may be formed into a three-dimensional shape, such as, for example, sphere, cylinder, cone, tetrahedron, square pyramid, triangular prism, cube, hexagonal prism, octagonal prism, octahedron, truncated octahedron, decagonal prism, dodecagonal prism, truncated cuboctahedron, truncated icosidodecahedron, rhombic dodecahedron, rhombic triacontahedron, rhombo-hexagonal dodecahedron, truncated rhombic dodecahedron, cuboctahedron, an irregular three-dimensional shape, etc. For example, the fourth nanoparticle 432 may have an equilateral square pyramid shape. In an example, the sixth nanoparticle 436 may have a cubic shape. In an example, the seventh nanoparticle 438 may have a three-dimensional shape including a triangular surface on eight sides, a square surface on six sides, and a rectangular surface on eight sides. In an example, the eighth nanoparticle 440 may have a three-dimensional shape including a square surface on twelve sides, an irregular hexagonal surface on eight sides, and an irregular octagonal surface on six sides. In an example, the ninth nanoparticle 442 may have a three-dimensional shape including a square surface on six sides and a hexagonal surface on twelve sides. In an example, the tenth nanoparticle 444 may have an irregular three-dimensional shape. The irregular three-dimensional shape may include, for example, six ellipsoid-like structures extending from a focal point.

Figure 5:
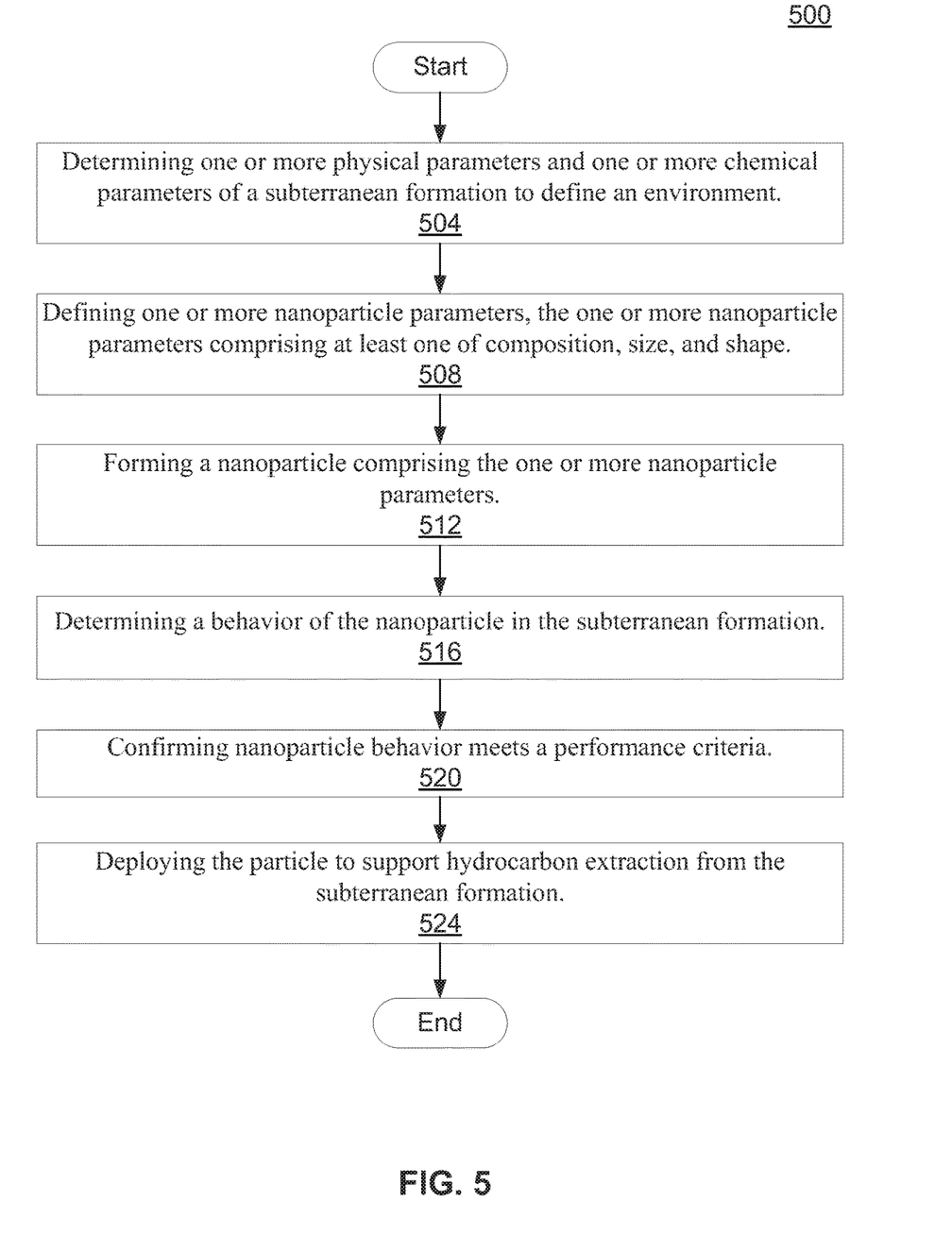
FIG. 5 is a flowchart of a method for designing a nanoparticle to support hydrocarbon extraction in a subterranean formation, according to an embodiment of the present invention.

Referring now to FIG. 5, a flowchart of a method 500 for designing a nanoparticle to support hydrocarbon extraction in a subterranean formation is shown, according to an embodiment of the invention. The nanoparticle may support hydrocarbon extraction by, for example, forming oil in water emulsions which may reduce surface tension, forming a wedge film to force oil off of a solid surface, increase water viscosity, or a combination thereof. In an embodiment, the method 500 may include determining one or more physical parameters and one or more chemical parameters of a subterranean formation to define an environment (step 504), defining one or more nanoparticle parameters, the one or more nanoparticle parameters comprising at least one of composition, size, and shape (step 508), forming a nanoparticle comprising the one or more nanoparticle parameters (step 512), determining a behavior of the nanoparticle in the subterranean formation (step 516), confirming nanoparticle behavior meets a performance criteria (step 520), and deploying the nanoparticles to support hydrocarbon extraction from the subterranean formation (step 524).

Step 504 may include determining one or more physical parameters and/or one or more chemical parameters (i.e. one or more environmental conditions) of a subterranean formation to define an environment. The subterranean formation 104 (FIG. 1) may include one or more physical parameters, such as, for example, a depth, length, volume, and porosity. The subterranean formation 104 (FIG. 1) may include one or more chemical parameters, such as, for example, temperature, pressure, pH, salinity, composition, and state of matter. A temperature of the subterranean formation 104 may be determined by inserting a thermometer into the subterranean formation 104 and receiving a temperature reading (e.g. a bottomhole pressure measurement, optical fiber measurement, etc.) and/or determined by calculating the temperature (e.g. a geothermal gradient calculation based on depth). A pressure of the subterranean formation may be determined by inserting a pressure sensing device into the subterranean formation 104 (e.g. a bottomhole pressure measurement, optical fiber measurement, etc.) and/or by calculating the pressure. A pH of the subterranean formation 104 may be determine by extracting a fluid sample, inserting a pH reading device into the subterranean formation 104, and or by calculating the pH based on other conditions. Composition of the subterranean formation 104 may include, for example, oil, water, and various minerals. For example, the subterranean formation may contain salt which may dissolve in water to create brine (i.e. a salt-water solution). Composition of the subterranean formation 104 may be determined by, for example, sampling fluid from the subterranean formation 104. A state of matter may include, for example, solid, liquid, gas, and plasma. A state of matter for a substance in the subterranean formation 104 may be determined by, for example, determining temperature and pressure and using the determined temperature and pressure to establish a state of matter for a substance with a known state at a given temperature and pressure. In an embodiment, the one or more environmental conditions may vary throughout the subterranean formation 104. For example, a pressure at a first location in the subterranean formation 104 may be different than a pressure at a second location in the subterranean formation 104. In an example, a substance may be a liquid in a first location and a gas in a second location. In an embodiment, one or more environmental conditions may change based on a measureable and/or predictable gradient throughout the subterranean formation 104. For example, pressure may increase with depth at a known and/or measured rate. In another example, temperature may increase with depth at a known and/or measured rate. In another example, the one or more environmental conditions may change over time. For example, pressure may be lower at a first time period with a low flow rate than at a second time period with a high flow rate.

Step 508 may include defining one or more nanoparticle parameters, the one or more nanoparticle parameters comprising at least one of composition, size, and shape. In an embodiment, a composition of a nanoparticle may be defined as a metal oxide, hydrophilic material, or a combination thereof. For example, the composition of the nanoparticle may be defined as a hydrophilic metal oxide, such as, for example, hydroxylated silicon oxide, hydroxylated titanium oxide, hydroxylated magnesium oxide, hydroxylated iron oxide, hydroxylated aluminum oxide, hydroxylated manganese oxide, and hydroxylated zinc oxide. In an embodiment, a size of a nanoparticle may be defined as having a maximum diameter ranging from approximately 1 nm to approximately 10 nm, and ranges therebetween. For example, a size of a nanoparticle may be defined as having a maximum diameter of approximately 7 nm. In an embodiment, a shape of a nanoparticle may be defined as a three-dimensional shape, such as, for example, a sphere, cylinder, cone, tetrahedron, square pyramid, triangular prism, cube, hexagonal prism, octagonal prism, truncated octahedron, decagonal prism, dodecagonal prism, truncated cuboctahedron, truncated icosidodecahedron, rhombic dodecahedron, rhombic triacontahedron, rhombo-hexagonal dodecahedron, truncated rhombic dodecahedron, cuboctahedron, or irregular three-dimensional shape. For example, a shape of a nanoparticle may be defined as an octahedron.

In an embodiment, defining one or more nanoparticle parameters may be based on one or more physical parameters and/or one or more chemical parameters (i.e. one or more environmental conditions) determined in step 504. For example, defining a composition of the nanoparticle as an acid-resistant material (e.g., titanium oxide) may be based on determining that a subterranean formation is highly acidic (i.e. has a low pH). In another example, defining a large size (e.g., 10 nm) of a nanoparticle may be based on determining that a subterranean formation has a high pressure (e.g., 90 MPa). In another example, defining a particular shape (e.g., a cube-like shape) may be based on determining that a subterranean formation has a high salinity (e.g., 270 parts per thousand). Various combinations of properties of nanoparticles to optimize nanoparticle penetration of an oil-water interface and the formation of a wedge film at the three phase contact line between oil-water-solid (e.g., oil-water-rock) interface based on various physical parameters and/or chemical parameters (i.e. environmental conditions) are contemplated.

Step 512 may include forming a nanoparticle with the one or more nanoparticle parameters. In an embodiment, a nanoparticle with a defined composition, size, and/or shape may be formed. In an embodiment, a defined nanoparticle parameter may influence formation of the nanoparticle. For example, defining a composition and crystal lattice orientation for a nanoparticle may influence a shape of the nanoparticle. In another example, defining a size of a nanoparticle may influence a shape of the nanoparticle. Various combinations of materials (i.e. compositions), crystal lattice orientations, and sizes to generate various shapes are contemplated.

Nanoparticles may be formed using any method known in the art. The method for forming nanoparticles may be selected based on the one or more nanoparticle parameters (e.g., composition, crystal lattice orientation, size, and shape). Examples of methods for forming nanoparticles include solvothermal processes, sol-gel process, co-precipitation processes, and solid state reactions. An example of a solvothermal process may involve a reaction mixture including a metal (e.g., titanium) and a solvent (e.g., ethylene glycol). Examples of the reaction mixture comprising various other ingredients, such as, for example, a second metal, salt, and/or water are contemplated. The reaction mixture may be heated in an autoclave at a temperature ranging from approximately 150 degrees Celsius to approximately 320 degrees Celsius for a period of time (e.g., approximately 4 to 6 hours). Heating the reaction mixture may produce nanoparticles of a particular composition (e.g., titanium oxide), shape (e.g., a rod shape), and size (e.g., 5 nm). Various other methods may be used to produce nanoparticles of various other compositions, shapes, and sizes.

Step 516 may include determining a behavior of the nanoparticle in the subterranean formation. In an embodiment, nanoparticle behavior in the subterranean formation may be determined through a computer model of the subterranean formation. For example, the one or more environmental conditions of the subterranean formation and the one or more parameters of the nanoparticle may be input into a computer. A program on the computer may run a model to analyze how the nanoparticle may interact with oil and/or water in the subterranean formation (e.g., (i) a contact angle in an oil-water interface; (ii) the nanoparticle free energy profile at the oil/water interface in order to establish the emulsion stability, type of emulsion: oil-in-water or water-in-oil and adsorption kinetics at the oil/water interface; (iii) the nanoparticle arrangement at the oil-water interface in order to establish the nanoparticle-nanoparticle interaction; (iv) the nanoparticle diffusion coefficient at oil and water; and (v) the nanoparticle rock surface interaction). All these properties may be determined under environmental conditions of the subterranean formation. In an embodiment, nanoparticle behavior in the subterranean formation may be determined by testing the nanoparticle in a laboratory. For example, the nanoparticle may be injected into a vessel having a similar pressure, acidity, and salinity as the subterranean formation. One or more tests may be performed to analyze how the nanoparticle interacts with oil and/or water in the vessel which may be representative of how the nanoparticle may interact with oil and/or water in the subterranean formations (e.g., a contact angle in an oil-water interface under environmental conditions of the subterranean formation may be determined, or the formation of a wedge film). In an embodiment, the nanoparticle may be injected into the subterranean formation and one or more tests may be performed to determine nanoparticle behavior. For example, the nanoparticle may be injected into the subterranean environment and the amount of oil recovery efficiency can be determined.

Step 520 may include confirming nanoparticle conforms to a performance criteria. In an embodiment, the nanoparticle behavior determined in step 516 may be analyzed to determine if the nanoparticle meets a performance criteria. Performance criteria may include, for example, an oil extraction rate, water viscosity, surface tension of an oil-in-water emulsion, retention rate, contact angle at an oil-water interface, emulsion stability, nanoparticle stability, droplet sizes of an oil-in-water emulsion, wedge film formation, ability to detach oil from rock surface, change of rock surface wettability, or any combination thereof. Examples of performance criteria may include one or more of the following: a contact angle between each nanoparticle of the set of nanoparticles and an oil-water interface; a nanoparticle free energy profile at the oil-water interface in order to establish the emulsion stability, type of emulsion (oil-in-water or water-in-oil and adsorption kinetics at the oil/water interface); a nanoparticle arrangement at the oil-water interface in order to establish the nanoparticle-nanoparticle interaction; a nanoparticle diffusion coefficient at the oil-water interface; a maximum emulsification rate of oil in water based in part on the one or more environmental conditions; a maximum spreading force or structural disjoining pressure for displacement of the oil from the solid surface due to the nanoparticle arrangement; and the formation of the wedge film at the three phase contact line at the oil, water, and rock interface. In an embodiment, if a nanoparticle fails to meet one or more performance criteria, the nanoparticle may be redesigned to have one or more different parameters. For example, a 7 nm diameter spherical nanoparticle composed of aluminum oxide may be redesigned as a 6 nm diameter spherical nanoparticle composed of titanium oxide. In an embodiment, confirming that a nanoparticle meets performance criteria and redesigning a nanoparticle may be repeated until a nanoparticle meeting performance criteria is designed.

Step 523 may include deploying the nanoparticles to support hydrocarbon extraction from the subterranean formation. In an embodiment, deploying the nanoparticles may include forming a colloidal suspension of nanoparticles and injecting the colloidal suspension into a subterranean formation. A colloidal suspension of nanoparticles may be produced by mixing nanoparticles with water at a molar ratio of nanoparticles to water ranging from about 1:10 to 1:1000. The colloidal suspension of nanoparticles may be injected into the subterranean formation through, for example, an injection well. In an embodiment, nanoparticles in the subterranean formation may penetrate a oil-water interface at a contact angle (e.g., about 80 degrees) to form a stable oil-in-water emulsion, reach the three phase interface (e.g., an intersection of oil, water, and rock) forming a wedge film to extract oil from rock and facilitate emulsion formation. In an embodiment, nanoparticles in the subterranean formation may increase water viscosity in the subterranean formation which may propel oil in a direction of water flow (e.g., towards an extraction well).

Embodiments of the present invention may provide a more stable and effective agent for extracting oil from a subterranean formation than exists in conventional methods. For example, a nanoparticle may be more stable in extreme environments (e.g., high pressure, low acidity, high salinity, etc.) than conventional methods (e.g., polymers and surfactants). Nanoparticles may have lower retention rates in rock formations than conventional methods (e.g., polymers and surfactants). Embodiments may provide a nanoparticle having one or more parameters (e.g., size, shape, crystal lattice, composition, etc.) specially designed to optimize oil extraction for a subterranean formation having one or more environmental conditions (e.g., pressure, acidity, salinity, etc.). For example, a nanoparticle may be formed with a hydrophilic material having a particular size and shape to enable penetration of an oil-water interface at an optimized contact angle (e.g., 80 degrees) and/or minimizing the contact area between oil and water and obtaining a stabilized oil-in-water emulsion with a small oil droplets size (e.g., diameters of 1 nm to 2 nm or 2 nm to 3 nm). In another example, a nanoparticle may be designed to increase water viscosity in the subterranean formation to propel oil in a direction of water flow. Embodiments of the present invention may enable oil extraction from a subterranean formation without requiring unstable materials (e.g., polymers and surfactants).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for selecting a nanoparticle to support oil extraction in a subterranean formation comprising:
   determining one or more environmental conditions of the subterranean formation;
   determining a set of nanoparticle parameters based on the one or more environmental conditions,
      wherein a nanoparticle having one or more nanoparticle parameters from the set of nanoparticle parameters displaces a volume of water greater than another volume of oil at equilibrium at an oil-water interface under the one or more environmental conditions;
      wherein the set of nanoparticle parameters comprise at least one of composition, size, or shape;
   determining a subset of nanoparticle parameters selected from the initial set of nanoparticle parameters, wherein a nanoparticle having the subset of nanoparticle parameters conforms to a performance criteria, wherein the performance criteria comprises one or more of the following:
      a contact angle between the nanoparticle and the oil-water interface of a spherical nanoparticle ranging from approximately 70 degrees to approximately 89 degrees,
      a free energy profile of the nanoparticle at the oil-water interface indicating an oil in water emulsion,
      a nanoparticle arrangement at the oil-water interface,
      a nanoparticle diffusion coefficient at the oil-water interface,
      a maximum emulsification rate of the oil in the water,
      a maximum spreading force or a structural disjoining pressure for displacement of the oil from a solid surface, or
      a formation of a wedge film at a three phase contact line at the oil, the water and a rock interface; and
   selecting the nanoparticle having the subset of nanoparticle parameters.

2. The method of claim 1, wherein the performance criteria further comprises one or more of the following:
   a nanoparticle arrangement at the oil-water interface to establish an interaction between the nanoparticle and other nanoparticles;
   a diffusion coefficient of the nanoparticle at the oil-water interface;
   a maximum emulsification rate of oil in water by the nanoparticle based in part on the one or more environmental conditions; or
   a structural disjoining pressure by the nanoparticle for displacement of oil from a solid surface.

3. The method of claim 1, the determining the set of nanoparticle parameters comprises:
   simulating behavior of one or more nanoparticles having one or more nanoparticle parameters from the set of nanoparticle parameters in a computer model of the subterranean formation having the one or more environmental conditions.

4. The method of claim 1, the determining the set of nanoparticle parameters comprises:
   analyzing one or more nanoparticles injected into a vessel having a medium with the one or more environmental conditions, wherein the one or more nanoparticles have one or more nanoparticle parameters from the set of nanoparticle parameters.

5. The method of claim 1, the determining the set of nanoparticle parameters comprises:
   analyzing one or more nanoparticles injected into the subterranean formation, wherein the one or more nanoparticles have one or more nanoparticle parameters from the set of nanoparticle parameters.

6. The method of claim 1, wherein the composition comprises at least one of hydroxylated silicon oxide, hydroxylated titanium oxide, hydroxylated magnesium oxide, hydroxylated iron oxide, hydroxylated aluminum oxide, hydroxylated manganese oxide, or hydroxylated zinc oxide.

7. The method of claim 1, wherein the size comprises a maximum diameter ranging from approximately 1 nm to approximately 10 nm.

8. The method of claim 1, wherein the one or more environmental conditions comprise at least one of temperature, pressure, pH, salinity, composition, or state of matter.

* * * * *